Feb. 5, 1957 H. EPSTEIN 2,780,774
MAGNETOSTRICTIVE DEVICE
Filed March 18, 1953

INVENTOR
HERMAN EPSTEIN
BY
Donald W. Phillion
ATTORNEY

United States Patent Office 2,780,774
Patented Feb. 5, 1957

2,780,774

MAGNETOSTRICTIVE DEVICE

Herman Epstein, Philadelphia, Pa., assignor to Burroughs Corporation, Detroit, Mich., a corporation of Michigan Application March 18, 1953, Serial No. 343,026

7 Claims. (Cl. 324—34)

This invention relates generally to transducers and more specifically to magnetostrictive transducers.

In the prior art there are many types of transducers including mechanical, electrical, electronic, magnetic, and others. Most of these transducers are not responsive to magnetic fields. Several types of transducers responsive to magnetic fields are well known in the art. Many of these are of a magnetic type in which an external magnetic field creates an induced voltage in the transducer. The present invention utilizes the characteristic of magnetostrictive materials in that said magnetostrictive materials will change their physical dimensions when placed in a magnetic field.

It is an object of the present invention to provide a magnetostrictive bi-couple transducer responsive to magnetic fields.

Another object of the invention is to provide a transducer of a simple structure capable of detecting magnetic fields.

A third object of the invention is the improvement of magnetic field responsive transducers generally.

In accordance with one embodiment of the invention a first strip of magnetostrictive material is secured at two or more points along its length to a second strip of material having a different magnetostrictive coefficient. When placed in a magnetic field the strips of magnetostrictive material change their respective lengths in different degrees causing a deflection of the coupled unit. This deflection can be measured by well known means. Since the deflection is linearly proportional within certain limitations to the strength of the magnetic field, the detection of said magnetic field is relatively straightforward.

In accordance with one feature of the invention the said first strip of magnetostrictive material has a positive coefficient of magnetostriction and the said second strip of material is of a magnetostrictive material having a negative coefficient of magnetostriction.

In accordance with another feature of the invention a coil may be placed around the two strips of material and signals introduced into the coil, which will cause linear deflection of the strips of material. Similarly, if the transducer is positioned near a magnetic tape the transducer will deflect linearly in accordance with the strength of the signal on the magnetic tape.

These and other objects and features of the invention will be more fully understood from the following detailed description thereof when read in conjunction with the drawings in which.

Figure 1:
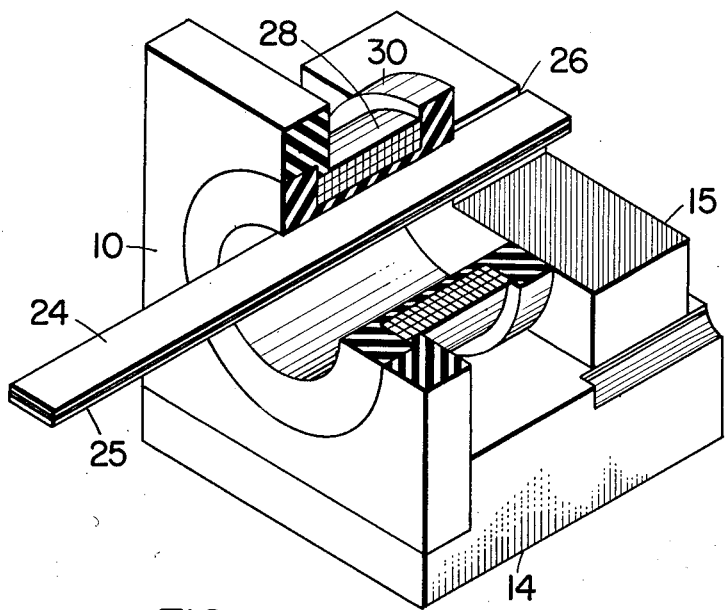
Fig. 1 is a perspective view of one embodiment of the invention.

Referring now to Fig. 1 there is shown a transducer composed of elements 24 and 25. Element 24 is a strip of magnetostrictive material such as nickel having a length of 4 inches, a width of 0.125 inch, and a thickness of 0.005 inch. Element 25 is a strip of magnetostrictive material such as Ni-Span C having a length of 4 inches, a width of 0.125 inch, and a thickness of 0.005 inch. The transducer is clamped securely in bracket 15 at point 26. Coil 28 is wound on the spool 30 and is positioned around the bimetallic transducer element 24—25. Spool 30 is mounted on brackets 10 and 15 by appropriate fastening means. The brackets 10 and 15 are mounted on base 14. The dimensions of the brackets 10 and 15, the spool 30, and the base 14 can be varied according to desired engineering design. In the preferred embodiment of the invention described herein the bracket 10 and the spool 30 are of Bakelite. Bracket 15 and base 14 are of aluminum.

Figure 2:
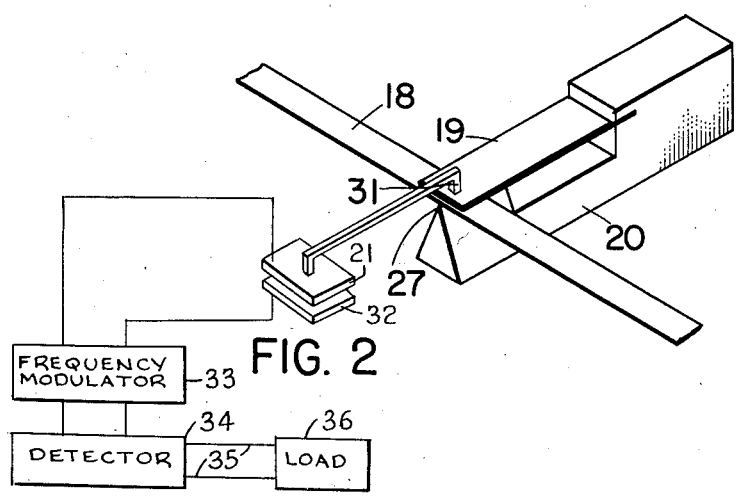
Fig. 2 is a perspective view of another embodiment of the invention.

Referring now to the embodiment of the invention illustrated in Fig. 2, element 19 is composed of two strips of magnetostrictive material fastened together and having different coefficients of magnetostriction. As in the case of the embodiment of Fig. 1, one of the two strips has a positive coefficient of magnetostriction and the other strip has a negative coefficient of magnetostriction. One of the two strips of magnetostrictive material comprising element 19 is composed of nickel. The other strip is composed of Ni-Span C. The dimensions of the strips of magnetostrictive material are as follows: the length is 4 inches, the width is 0.125 inch. The element 19 is held in base 20 which is of soft iron and forms a magnetic flux return path terminating in a wedge shaped portion 27 the edge of which, in cooperation with the magnetostrictive element, defines an air gap. It is to be noted that the edge of the wedge-shaped portion 27 of the magnetic element 20 is positioned substantially parallel to the longitudinal axis of the magnetostrictive element 19. Consequently, a flow of magnetic flux across the air gap is caused to be concentrated in a line effect, thus permitting the detection of small magnetized areas on a magnetic surface passed through said air gap. Connecting element 31 is abutted against the magnetostrictive element 19 and is also fastened to capacitor plate 21. Capacitor plates 32 and 21 form a capacitor whose capacitance can be varied by movement of the element 31 since the plate 21 moves with the connecting element 31 and plate 32 does not. This variation in capacitance is in accordance with the deflection of the magnetostrictive element 19. The output of the frequency modulator 33 varies in accordance with the spacing between the capacitor plates 21 and 32 and is supplied to the detector 34. Leads 35 are the output terminals of detector 34 and are connected to load 36.

Referring again to Fig. 1 the operation of the structure shown therein will be described.

It is well known in the art that magnetostrictive material will contract linearly or expand linearly when placed in a magnetic field depending on whether the coefficient of magnetostriction is negative or positive. Consequently, when the two strips of magnetostrictive material 24 and 25 having different coefficients of magnetostriction, one positive and one negative, are placed in a magnetic field the unclamped portion of said two strips of magnetostrictive material will be deflected. In the structure shown in Fig. 1 the magnetic field is created by coil 28. A varying signal can be introduced into the terminals of coil 28 and the magnetostrictive element 24—25 will deflect linearly in an accordingly varying manner. This deflection can be measured in a variety of well known means, none of which is shown in Fig. 1.

Referring now to Fig. 2 the operation of the structure shown therein will be described. A magnetic flux path can be traced from the air gap between magnetostrictive element 19 and portion 27 of the soft iron element 20, along the longitudinal axis of the magnetostrictive element 19, soft iron element 20, and back to the air gap. The effective extent of the gap laterally of flux flow thereacross is limited by the end surface of a tapered pole piece or projection 27 of element 20. If a magnetic flux is created in said air gap by a means such as magnetic tape 18 the magnetic flux caused to exist thereby in said magnetostrictive element 19 will cause said magnetostrictive element 19 to deflect in substantially linear proportion to the amount of magnetic flux therein. The deflection will vary in accordance with variation in the strength of the magnetic field in the said air gap 27. Deflection of the bimetallic element 19 will cause the plate 21 to move and thus vary the capacitance between plates 21 and 32. Frequency modulator 33 is adapted to modulate a signal in accordance with the variation of the capacitance between plates 21 and 32. Detector means 34 detects the output of frequency modulator 33 and the output of detector means 34 is delivered to load 36 through output leads 35.

The bi-metal magnetostrictive strip may be utilized to measure the strength of magnetic fields other than the types shown in Figs. 1 and 2. Many different adaptions and configurations of the device can be made to perform specific tasks. Further, different materials can be used without departing from the scope or spirit of the invention.

What is claimed is:

1. A transducer adapted to detect magnetic signals on a magnetic surface comprising a magnetic loop having an air gap therein, said magnetic loop comprising a first portion and a second portion, said first portion being of a magnetic material and being shaped in a wedge-like manner at the air gap so as to present the edge of the wedge to the said second portion, said second portion being comprised of two strips of magnetostrictive material secured together in side-by-side relation, one of said strips having a positive coefficient of magnetostriction and the other of said strips having a negative coefficient of magnetostriction, said second portion adapted to become deflected in accordance with the amount of magnetic flux flowing therethrough when the magnetic signals on a magnetic surface are caused to be passed through the said air gap, and means to detect the deflection of said second portion.

2. A transducer for detecting magnetic signals recorded on a magnetic surface comprising an elongated element composed at least in part of magnetostrictive material and having the property of deflecting varying amounts proportional to the change in magnetic flux therein, a magnetic element, one end of said magnetostrictive element being secured in said magnetic element while the other end is free, said magnetic element having a wedge-shaped portion thereof positioned adjacent to but spaced from the free end of said magnetostrictive element in such a manner as to extend substantially parallel to the longitudinal dimension of the magnetostrictive element and to form an air gap between the apex of the wedge and the magnetostrictive element, said air gap being provided to afford a space through which a magnetic surface having magnetic signals recorded thereon may be passed for creating a magnetic flux in said magnetostrictive element as each signal is conducted through the space, and means for detecting the deflection of said magnetostrictive element.

3. A transducer for detecting small magnetized areas recorded on a magnetic tape comprising an elongated bimetallic element, an element of magnetic material, a first end of said bimetallic element being rigidly secured in said element of magnetic material, said magnetic element and said bimetallic element forming a loop having an air gap between a portion of said element of magnetic material and the second end of said bimetallic element such that when a magnetic tape having recorded signals thereon is passed through said air gap a magnetic flux is caused to flow through said loop, the said portion of said magnetic element being formed in a tapered manner so that the small end of the taper forms one boundary of the air gap, said bimetallic element being comprised of a first elongated element of magnetostrictive material having a positive coefficient of magnetostriction and a second elongated element of magnetostrictive material having a negative coefficient of magnetostriction, and means to detect deflection of said bimetallic element.

4. A device for detecting magnetic signals on magnetic tape and like recording media comprising a structure forming a magnetic loop and having an air gap, one side of the air gap being formed by the free end of an elongated relatively flat metallic strip having the magnetostrictive property of flexing in response to changes in magnetic flux to which the strip is subjected, the other side of the air gap being formed by a rigid magnetic member disposed opposite to one flat side of the free end of the strip and provided with a wedge-like edge projecting toward the strip and extending parallel to the longitudinal dimension thereof, electrical means for detecting the flexing movement of the strip including a capacitor having a movable plate, and means forming a connection between the free end of the strip and the movable plate of the capacitor and moving the latter in response to the flexure of the strip.

5. A device for detecting magnetic signals on magnetic tape and like media comprising, in combination, a generally U-shaped structure forming a magnetic loop and having an air gap through which a magnetic tape may be passed, one leg of the U-shaped structure being constituted by a thin relatively flat metallic member having magnetostrictive properties such that it will flex in response to changes in mangetic flux to which it is subjected, the other leg of the U-shaped structure being constituted by a rigid member extending substantially co-extensive with the magnetostrictive member and positioned in spaced relation to one side thereof, means forming part of the structure and serving as a common support for one end of each of the two members while the opposite ends of the two members terminate in free space, a projection on the free end of the rigid member extending toward the free end of the magnetostrictive member but terminating short thereof to form the air gap of the structure, said magnetostrictive member adapted to flex in response to magnetic areas on a magnetic tape passing through the air gap, and means for converting the mechanical flexing movement of the magnetostrictive member into detectable electrical signals.

6. Means responsive to the introduction of magnetized material into a gap of specified configuration comprising in combination a first member characterized by magnetostrictive properties, and a second member characterized by relatively high magnetic permeability, said members being in series in a magnetic circuit closed except as to a narrow gap bounded by opposed surface areas of the two members, respectively, one of said areas being a narrow end surface of a projection of decreased section extending from the body of one of said members defining the effective width of said gap laterally of the direction of flux flow thereacross, the magnetostrictive properties of said first member deriving from elongated components thereof respectively formed of materials having different magnetostrictive coefficients, said components extending in parallel relationship longitudinally of said magnetic circuit and being bonded together at longitudinally spaced points and jointly restrained against displacement at corresponding terminal portions, only, thereof remote from said gap, whereby the introduction of magnetized material into said gap causes a change of flux density in said magnetostrictive components effective to produce differential dimensional changes thereof and cause said first member to assume a new position.

7. The combination defined in claim 6 which further includes electrical means responsive to the position of said first member.

References Cited in the file of this patent

UNITED STATES PATENTS

| | | |
|---|---|---|
| 1,889,153 | Pierce | Nov. 29, 1932 |
| 1,951,018 | Herdman | Mar. 13, 1934 |
| 2,030,101 | De Lanty | Feb. 11, 1936 |
| 2,441,158 | Krasnow | May 11, 1948 |
| 2,542,075 | Firth | Feb. 20, 1951 |